(12) United States Patent
Witko (10) Patent No.: US 11,463,304 B2
(45) Date of Patent: *Oct. 4, 2022

(54) SERVICE RECOVERY IN A SOFTWARE DEFINED NETWORK

(71) Applicant: AT&T Intellectual Property I, L.P., Atlanta, GA (US)

(72) Inventor: Paul Witko, Long Valley, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 39 days.

This patent is subject to a terminal disclaimer.

(21) Appl. No.: 16/871,937

(22) Filed: May 11, 2020

(65) Prior Publication Data
US 2020/0274762 A1 Aug. 27, 2020

Related U.S. Application Data

(63) Continuation of application No. 15/967,828, filed on May 1, 2018, now Pat. No. 10,652,084.

(51) Int. Cl.
*G06F 15/177* (2006.01)
*H04L 41/0806* (2022.01)
(Continued)

(52) U.S. Cl.
CPC ...... *H04L 41/0806* (2013.01); *H04L 41/0695* (2013.01); *H04L 41/20* (2013.01); *H04L 67/141* (2013.01)

(58) Field of Classification Search
CPC ............... H04L 41/082; H04L 41/0213; H04L 41/0816; H04L 41/5054; H04L 43/06; H04L 43/12; H04L 67/10; H04L 43/50
See application file for complete search history.

(56) References Cited

U.S. PATENT DOCUMENTS 6,891,851 B1 * 5/2005 Demakakos ............ H04L 43/50
370/467
9,722,856 B2 * 8/2017 Nagasubramaniam .....................
H04L 41/0213
(Continued)

FOREIGN PATENT DOCUMENTS

EP 3217598 A1 9/2017
WO 2016206502 A1 12/2016
(Continued)

OTHER PUBLICATIONS

Zhao, Bin, et al. "Survivable control plane establishment with live control service backup and migration in SD-EONs." IEEE/OSA Journal of Optical Communications and Networking 8.6 (2016): 371-381.
(Continued)

*Primary Examiner* — Dustin Nguyen (57) ABSTRACT

In one example, the present disclosure describes a device, computer-readable medium, and method for restoring local access elements in a software defined network (SDN) following service outages. For instance, in one example, a method includes retrieving, by a software defined networking local access element connected to a customer premises, configuration data and customer provisioning data from equipment located at the customer premises and initializing the software defined networking local access element with the configuration data and customer provisioning data to provide service to the customer premises.

20 Claims, 4 Drawing Sheets

(51) Int. Cl.
   *H04L 67/141* (2022.01)
   *H04L 41/00* (2022.01)
   *H04L 41/0695* (2022.01)

(56) References Cited

U.S. PATENT DOCUMENTS

| | | | |
|---|---|---|---|
| 2013/0166703 A1 | 6/2013 | Hammer et al. | |
| 2014/0325649 A1 | 10/2014 | Zhang | |
| 2015/0142932 A1 | 5/2015 | Hallivuori et al. | |
| 2015/0188837 A1* | 7/2015 | Djukic | H04L 43/06 709/226 |
| 2016/0057052 A1 | 2/2016 | Zhang et al. | |
| 2016/0119165 A1 | 4/2016 | Keronen | |
| 2016/0154715 A1 | 6/2016 | Hamdi et al. | |
| 2016/0315813 A1* | 10/2016 | Pech | H04L 41/0816 |
| 2016/0316011 A1 | 10/2016 | Venkataraman et al. | |
| 2016/0344624 A1 | 11/2016 | Banikazemi et al. | |
| 2017/0288947 A1 | 10/2017 | Kaniampady Sebastian et al. | |
| 2017/0324562 A1 | 11/2017 | Laffey | |
| 2017/0332438 A1 | 11/2017 | Olsson et al. | |
| 2017/0357528 A1* | 12/2017 | Puranik | H04L 67/10 |
| 2018/0007147 A1* | 1/2018 | Sareen | H04L 41/082 |
| 2018/0048525 A1 | 2/2018 | Karasaridis et al. | |
| 2018/0287859 A1 | 10/2018 | Desigowda et al. | |
| 2019/0058656 A1* | 2/2019 | Gundersen | H04L 41/082 |
| 2019/0166415 A1* | 5/2019 | Garcia Osma | H04L 41/5054 |
| 2020/0169494 A1* | 5/2020 | K | H04L 43/12 |

FOREIGN PATENT DOCUMENTS

| | | |
|---|---|---|
| WO | 2017012431 A1 | 1/2017 |
| WO | 2017066125 A1 | 4/2017 |
| WO | 2017092400 A1 | 6/2017 |
| WO | 2017219957 A1 | 12/2017 |

OTHER PUBLICATIONS

Sanchez, Jose, et al. "Softwarized 5G networks resiliency with self-healing." 5G for Ubiquitous Connectivity (5GU), 2014 1st International Conference on. IEEE, 2014.

Yu, Peng, et al. "Self-Organized Cell Outage Detection Architecture and Approach for 5G H-CRAN."

* cited by examiner

SERVICE RECOVERY IN A SOFTWARE DEFINED NETWORK

This application is a continuation of U.S. patent application Ser. No. 15/967,828, filed on May 1, 2018, now U.S. Pat. No. 10,652,084, which is herein incorporated by reference in its entirety.

The present disclosure relates generally to software defined networking, and relates more particularly to devices, non-transitory computer-readable media, and methods for restoring local access elements in a software defined network following service outages.

BACKGROUND

Cloud computing is an information technology (IT) paradigm that achieves coherence and scalability through the sharing of computing resources. One specific approach to cloud computing is software defined networking (SDN), which consolidates the network intelligence in a centralized network component. This is accomplished by decoupling the data plane (i.e., the data packet forwarding process) and the control plane (i.e., the packet routing process), and implementing the control plane in one or more SDN controllers that are directly programmable. Thus, SDN may be used to deliver data services to a network of customers.

In some SDN implementations, the functionality traditionally provided via customer premises equipment can be offloaded to the cloud, so that all that is deployed at or near the customer premises is an SDN local access element. The local access element receives its configuration and provisioning data from management applications and databases hosted in the cloud, e.g., on an SDN controller.

SUMMARY

In one example, the present disclosure describes a device, computer-readable medium, and method for restoring local access elements in a software defined network (SDN) following service outages. For instance, in one example, a method includes retrieving, by a software defined networking local access element connected to a customer premises, configuration data and customer provisioning data from equipment located at the customer premises and initializing the software defined networking local access element with the configuration data and customer provisioning data to provide service to the customer premises.

In another example, a software defined networking local access element includes a processor and a computer-readable medium storing instructions which, when executed by the processor, cause the processor to perform operations. The operations include retrieving configuration data and customer provisioning data for the software defined networking local access element from equipment located at a customer premises and initializing the software defined networking local access element with the configuration data and customer provisioning data to provide service to the customer premises.

In another example, a computer-readable medium stores instructions which, when executed by the processor, cause the processor to perform operations. The operations include retrieving configuration data and customer provisioning data for a software defined networking local access element from equipment located at a customer premises and initializing the software defined networking local access element with the configuration data and customer provisioning data to provide service to the customer premises.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides a system, method, and non-transitory computer readable medium for restoring local access elements in a software defined network (SDN) following service outages. As discussed above, software defined networking may be used to deliver data services to a network of customers. In some SDN implementations, the functionality traditionally provided via customer premises equipment can be offloaded to the cloud, so that all that is deployed at or near the customer premises is an SDN local access element (also referred to as a "white box"). The local access element accesses management applications and databases hosted remotely in the cloud, e.g., on an SDN controller. The management applications and databases may store, among other data, configuration and provisioning data for the local access element.

Although this arrangement simplifies the delivery of data services and reduces equipment costs, it is vulnerable to service outages (e.g., due to power loss, maintenance or repair resets, or other events that disrupt the connectivity between the SDN local access element and the SDN controller), as in order to restore service to the customer premises, the local access element must connect to the cloud to retrieve its last known configuration and provisioning data from the SDN controller and/or databases. Without this information, the local access element may not be able to complete its initialization and restore service. Conventionally, the local access element may re-connect to the management applications and databases in the cloud via a plurality of wide area networking resources, which may be distributed across various service providers and facilities. If the local access element is unable to connect to the SDN controller in the cloud due to failures of these resources, however, then service may not be able to be restored to the customer premises.

Examples of the present disclosure store configuration data and/or customer provisioning data in equipment at the customer premises, such as gateway devices and/or digital devices connected to the gateway devices, that are connected to an SDN local access element. The configuration data and/or customer provisioning data includes enough information regarding line upstream and downstream speeds and the types of services delivered to the customer premises to allow the SDN local access element to reconstruct its configuration and customer provisioning. When the SDN local access element is unable to connect to the SDN controller in the cloud to retrieve this data, it may instead retrieve the data from the equipment at the customer premises. In this way, at least some service may be restored to the customer premises even though the SDN local access element may be unable to connect to the cloud.

Examples of the present disclosure are discussed within the context of providing data services to a network of customers. It will be understood that data services may encompass a wide variety of services. For instance, many traditional services, such as telephone, television, and high-speed Internet services, can be delivered as streams of data that are routed to the appropriate digital devices.

Figure 1:
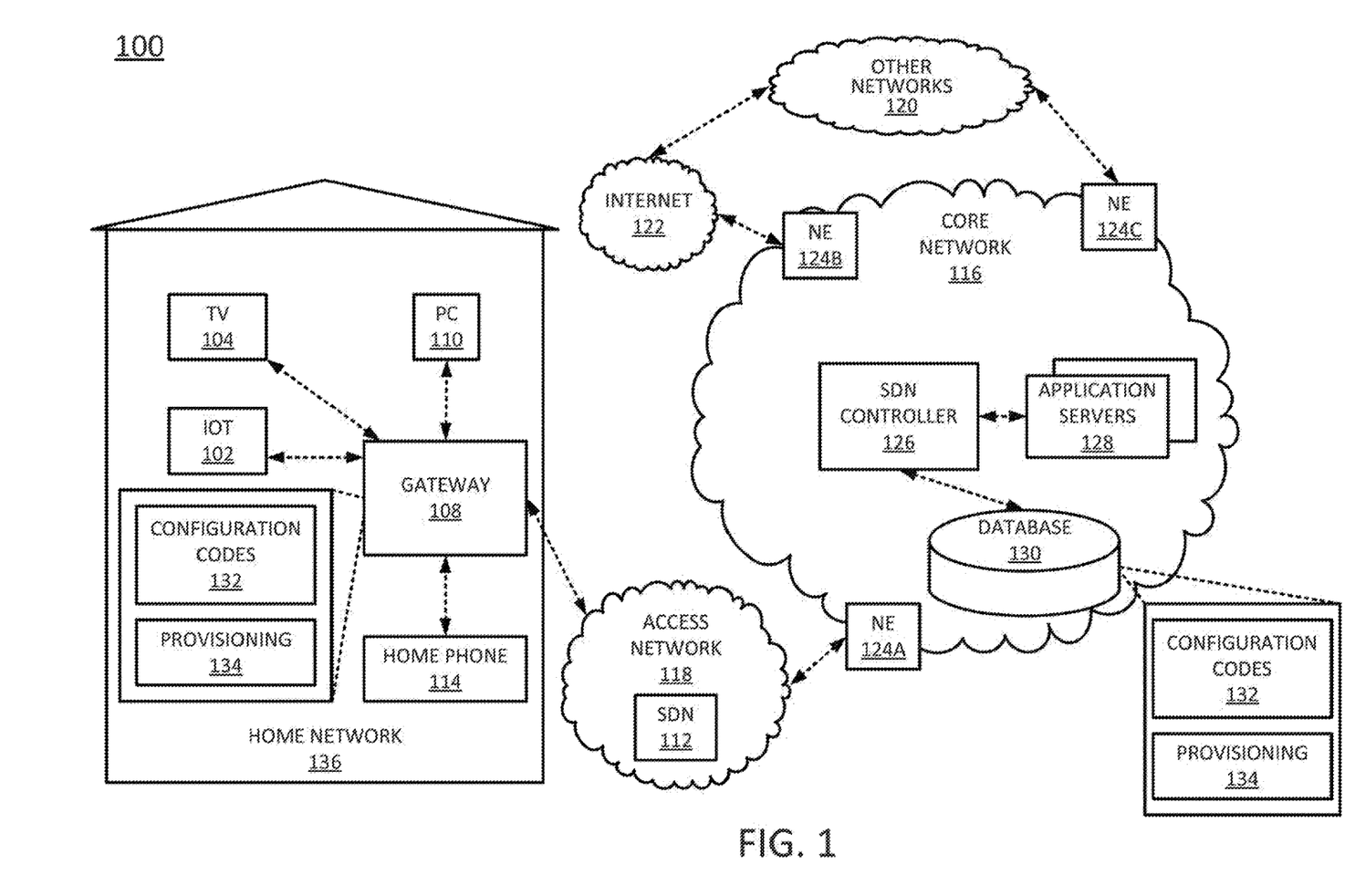
FIG. 1 illustrates an example network related to the present disclosure.

To better understand the present disclosure, FIG. 1 illustrates an example network 100 related to the present disclosure. As shown in FIG. 1, the network 100 may comprise a content distribution network (e.g., data network) that connects digital devices such as smart home or Internet of Things (IOT) devices 102 (e.g., smart thermostats, smart lighting systems, smart security systems, etc.), smart televisions (TVs) 104, gateway devices 108, personal computers (PCs) 110, home telephones 114, other devices not pictured (such as mobile devices, digital assistants, and the like), and so forth, with one another and with various other devices via a core network 116, an access network 118, other networks 120 and/or the Internet 122. Devices such as IOT devices 102, televisions (TVs) 104, gateways 108, personal computers (PCs) 110, home telephones 114, mobile devices, and other similar devices may also be referred to herein as "customer devices" or "user endpoint devices."

As illustrated in FIG. 1, network 100 includes a core network 116. In one example, core network 116 may functionally comprise a fixed mobile convergence (FMC) network, e.g., an IP Multimedia Subsystem (IMS) network. In addition, core network 116 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 116 may also further comprise a broadcast television network, e.g., a traditional cable provider network or an Internet Protocol Television (IPTV) network, as well as an Internet Service Provider (ISP) network. The network elements 124A-124C may serve as gateway servers or edge routers to interconnect the core network 116 with other networks 120, Internet 122, access network 118, and so forth. As shown in FIG. 1, core network 116 may also include an SDN controller 126, a plurality of application servers 128, and a database 130. For ease of illustration, various additional elements of core network 116 are omitted from FIG. 1.

In one example, SDN controller 126 may be responsible for instantiating, configuring, managing, and releasing managing applications for providing services to customer premises. For example, in an SDN architecture, an SDN controller may instantiate managing applications on shared hardware, e.g., host devices/SDN local access elements, which may be physically located in various places. In one example, the configuring, releasing, and reconfiguring of SDN local access elements is controlled by the SDN controller 126, which may store configuration codes 132, e.g., computer/processor-executable programs, instructions, or the like for various functions which can be loaded onto an SDN local access element, in the database 130. In another example, the SDN controller 126 may instruct, or request an SDN local access element to retrieve appropriate configuration codes 132 from customer premises equipment, e.g., a gateway device or other device in the home network 136, as discussed in greater detail below, to accelerate failure recovery.

In addition to the configuration codes 132, the database 130 may store provisioning data 134 for the customers of the network 100. This provisioning data 134 may include customer access rights and privileges (e.g., to ensure the security of network resources and user privacy), data that ensures compliance and minimizes the vulnerability of systems to penetration and abuse, and boot image control and/or other data to reduce the amount of custom configuration data 132 stored in the database 130. For instance, specific types of data that may be stored as customer provisioning data may include virtual local area network (VLAN) identifiers that identify customers, each type of service being sent to a particular VLAN, Internet Protocol (IP) addresses of various endpoint devices used by customers to access services, customer-side service characteristics (e.g., upstream and downstream data speeds for specific customers), and feeder facility-side service characteristics (e.g., circuit identifiers, VLAN identifiers, upstream and downstream data speeds, etc.).

In one example discussed in further detail below, the configuration codes 132 and/or provisioning data 134 may also be stored on various equipment located at or near customer premises, such as on gateway devices in customer home networks (e.g., gateway device 108 of home network 136) and/or on digital devices connected to the gateway devices. In one example, any or all of the SDN controller 126 or customer premises equipment may comprise a computing system, such as computing system 400 depicted in FIG. 4.

In one example, the access network 118 may comprise a Local Area Network (LAN), a cellular or wireless access network, a $3^{rd}$ party network, and the like. In this regard, access network 118 may include an SDN local access element (also referred to as a "whitebox") 112 that communicates with the SDN controller 126 to provide services to the home networks of various customers (e.g., home network 136). To this end, the SDN local access element 112 may include an interface that connects to the SDN controller 126, as well as at least one interface that connects to a customer premises. For instance, in FIG. 1, the SDN local access element 112 is connected, via the access network 118, to the gateway device 108 of the home network 136. Although only a single connection between the SDN local access element 112 and a customer premises is illustrated in FIG. 1, many such connections may exist to connect the SDN local access element 112 to other customer premises. Access network 118 may also transmit and receive communications between home network 136 and core network 116 relating to communications with web servers via the Internet 122 and/or other networks 120, and so forth.

In one example, home network 136 may include a gateway device 108, which receives streams of data associated with different types of media, e.g., television, phone, and Internet, and separates these communications for the appropriate digital devices to which the gateway device 108 is connected. The streams of data may be received via access network 118, for instance. In one example, television data files are forwarded to a smart television (TV) 104 to be decoded, recorded, and/or displayed. Similarly, Internet communications are sent to and received from gateway device 108, which may be capable of both wired and/or wireless communication. In turn, gateway device 108 receives streams of data from and sends streams of data to the appropriate devices, e.g., personal computer (PC) 110, home phone 114, and/or other devices. Each of these devices may be configured to support media content of particular file formats. TV 104 may also be configured to support media content of particular file formats. In one example, gateway device 108 may comprise a wired Ethernet router and/or an Institute for Electrical and Electronics Engineers (IEEE) 802.11 (Wi-Fi) router, and may communicate with respective devices in home network 136 via wired and/or wireless connections.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 116 is not limited to an IMS network. Similarly, the present disclosure is not limited to an IP/MPLS network for VoIP telephony services, or any particular type of broadcast television network for providing television services, and so forth.

Figure 2:
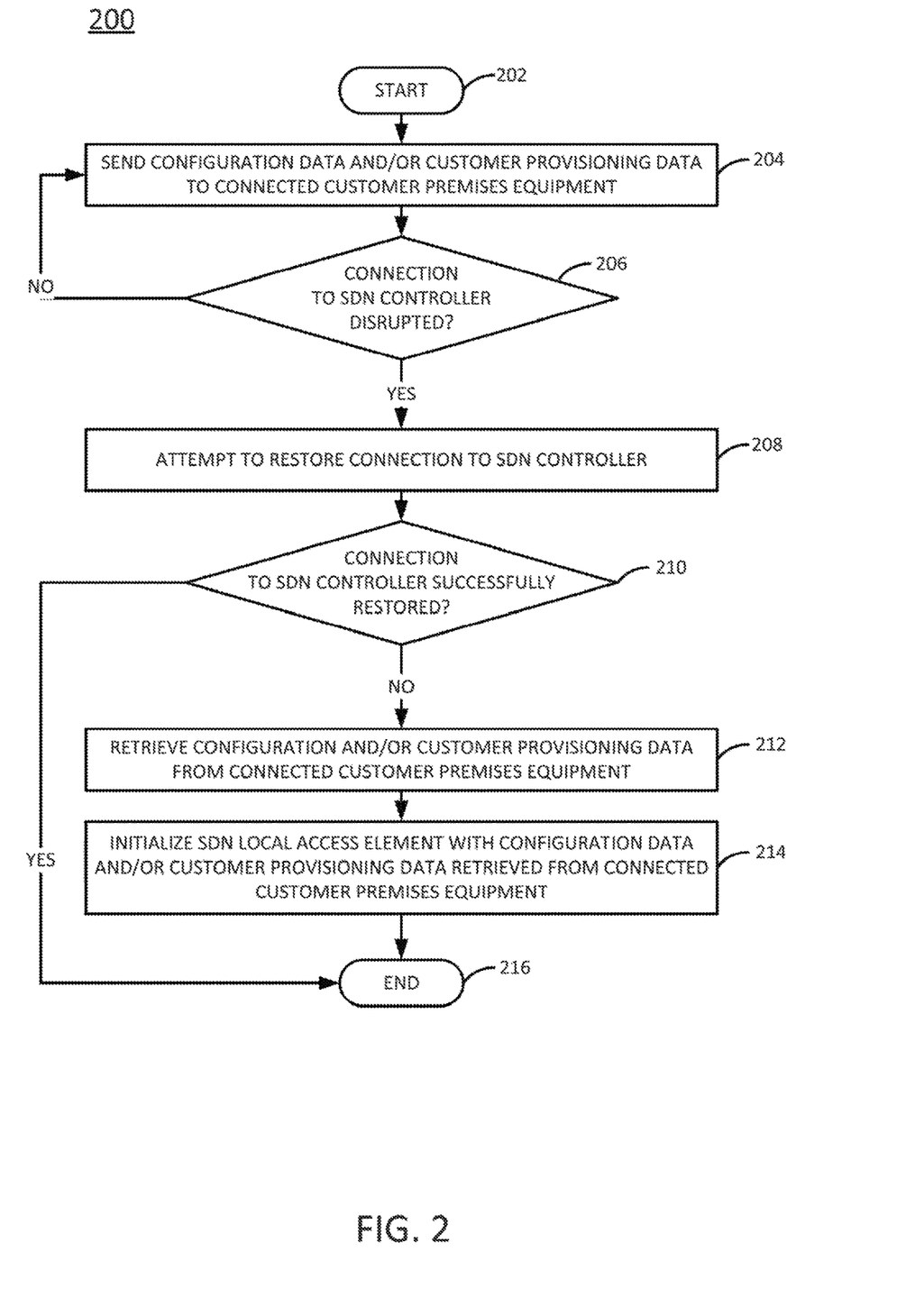
FIG. 2 illustrates a flowchart of a first example method for restoring service to a local access element in a software defined network.

To further aid in understanding the present disclosure, FIG. 2 illustrates a flowchart of a first example method 200 for restoring a local access element in a software defined network (SDN). In one example, the method 200 may be performed by the SDN local access element 112 illustrated in FIG. 1. However, in other examples, the method 200 may be performed by another device. As such, any references in the discussion of the method 200 to the SDN local access element 112 of FIG. 1 (or any other elements of FIG. 1) are not intended to limit the means by which the method 200 may be performed.

The method 200 begins in step 202. In step 204, the SDN local access element sends its configuration data and/or customer provisioning data to connected customer premises equipment. The configuration data and/or customer provisioning data includes enough information regarding line upstream and downstream speeds and the types of services delivered to the customer premises to allow the SDN local access element to reconstruct its configuration and customer provisioning.

The customer premises equipment may comprise a gateway device, a digital device connected to the gateway device, or other equipment at the customer premises to which the SDN local access element can connect. The configuration data and/or customer provisioning data may be sent periodically (e.g., regularly according to a predefined schedule), randomly (e.g., on a random schedule as network conditions may allow), or in response to the occurrence of a predefined event. In one example, the SDN local access element sends its configuration data and/or customer provisioning data to connected customer premises equipment at least once, automatically upon initially connecting to the customer premises equipment. The SDN local access element may continue to provide service to the customer premises as normal during step 204.

In step 206, it is determined whether the connection between the SDN local access element and the SDN controller in the cloud has been disrupted. The disruption in the connection may be caused, for example, by the SDN local access element and/or the SDN controller temporarily losing power, by other equipment in the access network and/or core network temporarily losing power, or by a reset of the SDN local access element and/or SDN controller for maintenance or repair. The disruption may be detected in one example when power is restored to the SDN local access element following a loss of power, and the SDN local access element attempts to access its configuration data and/or customer provisioning data from the SDN controller so that it can re-initialize. If it is determined in step 206 that no disruption in the connection between the SDN local access element and the SDN controller in the cloud has occurred, then the method 200 may return to step 204, and the SDN local access element may continue to send its configuration data and/or customer provisioning data to the customer premises equipment.

If, however, it is determined in step 206 that a disruption in the connection between the SDN local access element and the SDN controller in the cloud has occurred, then the method 200 may proceed to step 208. In step 208, restoration of the connection between the SDN local access element and the SDN controller in the cloud may be attempted.

In step 210, it is determined whether the connection between the SDN local access element and the SDN controller in the cloud has been successfully restored. In one example, if the disruption in the connection was caused by the failure of other network equipment (e.g., in the access network and/or the core network), then the SDN local access element may not be able to restore the connection to the SDN controller. If it is determined in step 210 that the connection between the SDN local access element and the SDN controller in the cloud has been successfully restored, then the method 200 may end in step 216.

If, however, it is determined in step 210 that connection between the SDN local access element and the SDN controller in the cloud has not been successfully restored, then the method 200 may proceed to step 212. In step 212, configuration data and/or customer provisioning data for the SDN local access element may be retrieved from the connected customer premises equipment (e.g., the connected customer premises equipment to which the configuration data and/or customer provisioning data was sent in step 204).

In step 214, the SDN local access element may be initialized using the configuration data and/or customer provisioning data that was retrieved from the connected customer premises equipment in step 212. Once the SDN local access element is successfully initialized with the configuration data and/or customer provisioning data, it may be able to restore service to the customer premises, even if it is unable to connect to the SDN controller in the cloud.

The method 200 may then end in step 216. In some examples, the method 200 may repeat. That is, after a successful initialization of the SDN local access element according to the method 200, the method 200 may be performed again, so that the connected customer premises equipment will continue to store up-to-date configuration data and/or customer provisioning data for the SDN local access element. Throughout some or all of the steps of the method 200, the SDN local access element may continue to provide service to the customer premises as normal.

Figure 3:
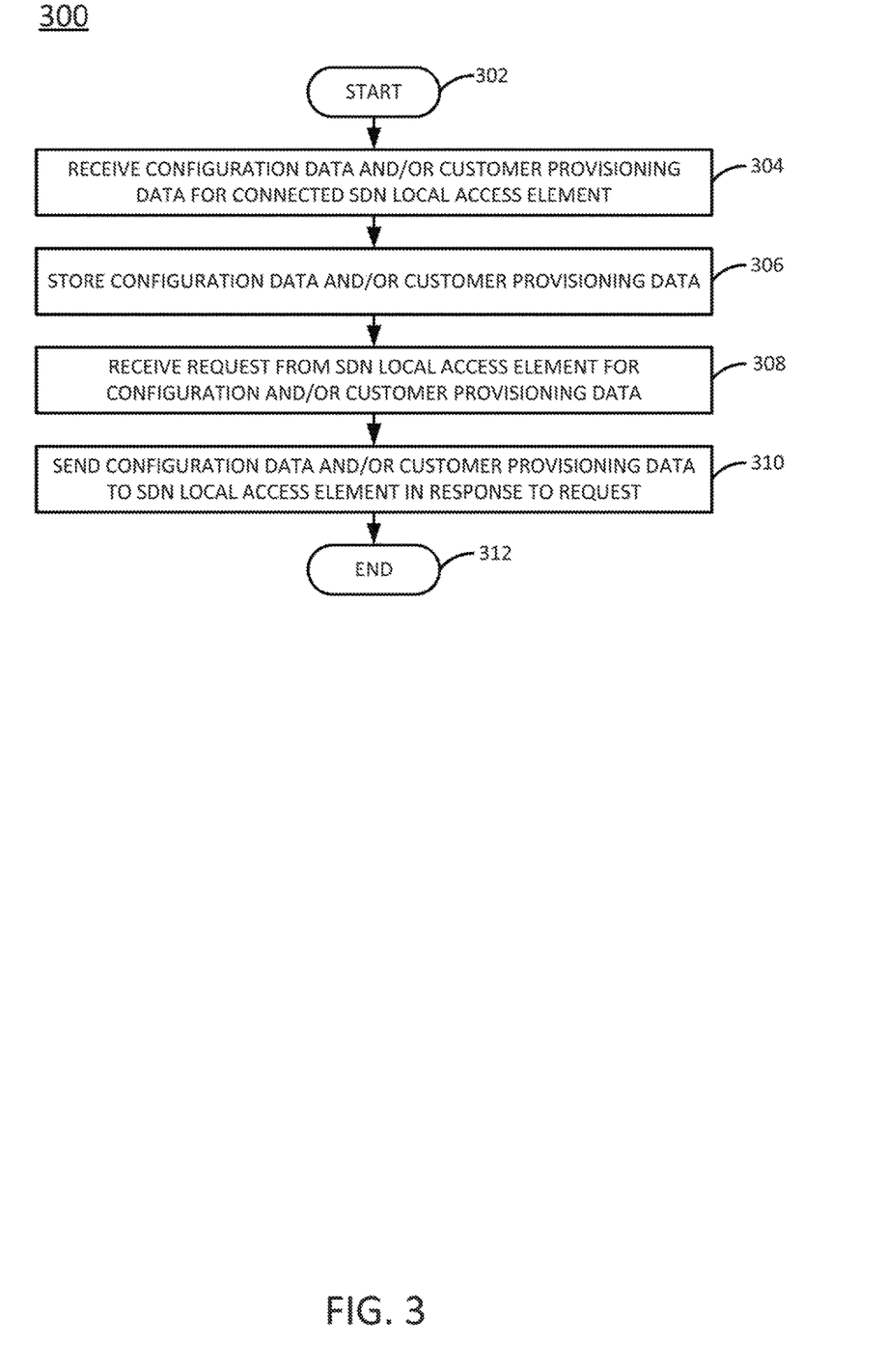
FIG. 3 illustrates a flowchart of a second example method for restoring a local access element in a software defined network.

FIG. 3 illustrates a flowchart of a second example method 300 for restoring a local access element in a software defined network (SDN). In one example, the method 300 may be performed by customer premises equipment connected to an SDN local access element, such as the gateway device 108 illustrated in FIG. 1 or any of the digital devices connected to the gateway device 108. However, in other examples, the method 300 may be performed by another device. As such, any references in the discussion of the method 300 to the router 108 of FIG. 1 (or any other elements of FIG. 1) are not intended to limit the means by which the method 300 may be performed.

The method 300 begins in step 302. In step 304, configuration data and/or customer provisioning data for a connected SDN local access element is received from the connected SDN local access element. The configuration data and/or customer provisioning data includes enough information regarding line upstream and downstream speeds and the types of services delivered to the customer premises to allow the SDN local access element to reconstruct its configuration and customer provisioning. As discussed above, the configuration data and/or customer provisioning data may be sent periodically (e.g., according to a predefined schedule), randomly (e.g., as network conditions may allow), or in response to the occurrence of a predefined event. In one example, the SDN local access element sends its configuration data and/or customer provisioning data to connected customer premises equipment at least once, upon initially connecting to the customer premises equipment. The SDN local access element may continue to provide service to the customer premises as normal during step 304.

In step 306, the configuration data and/or customer provisioning data received in step 304 is stored. In one example, the configuration data and/or customer provisioning data is stored locally by the connected customer premises equipment that received the data. In another example, the connected customer premises equipment may store the configuration data and/or customer provisioning data in remote storage that is accessible to the connected customer premises equipment. The remote storage may comprise storage on another device at the customer premises.

In step 308, a request is received from the SDN local access element for the configuration data and/or customer provisioning data. In one example, the SDN local access element may have temporarily lost power and/or connectivity, and may not be able to connect to the SDN controller in the cloud to retrieve the configuration data and/or customer provisioning data.

In step 310, the configuration data and/or customer provisioning data is sent to the SDN local access element in response to the request received in step 308. The method 300 then ends in step 312.

Although not expressly specified above, one or more steps of the methods 200 and 300 may include a storing, displaying, and/or outputting step as required for a particular application. In other words, any data, records, fields, and/or intermediate results discussed in the method can be stored, displayed and/or outputted to another device as required for a particular application. Furthermore, operations, steps, or blocks in FIGS. 2 and 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

Figure 4:
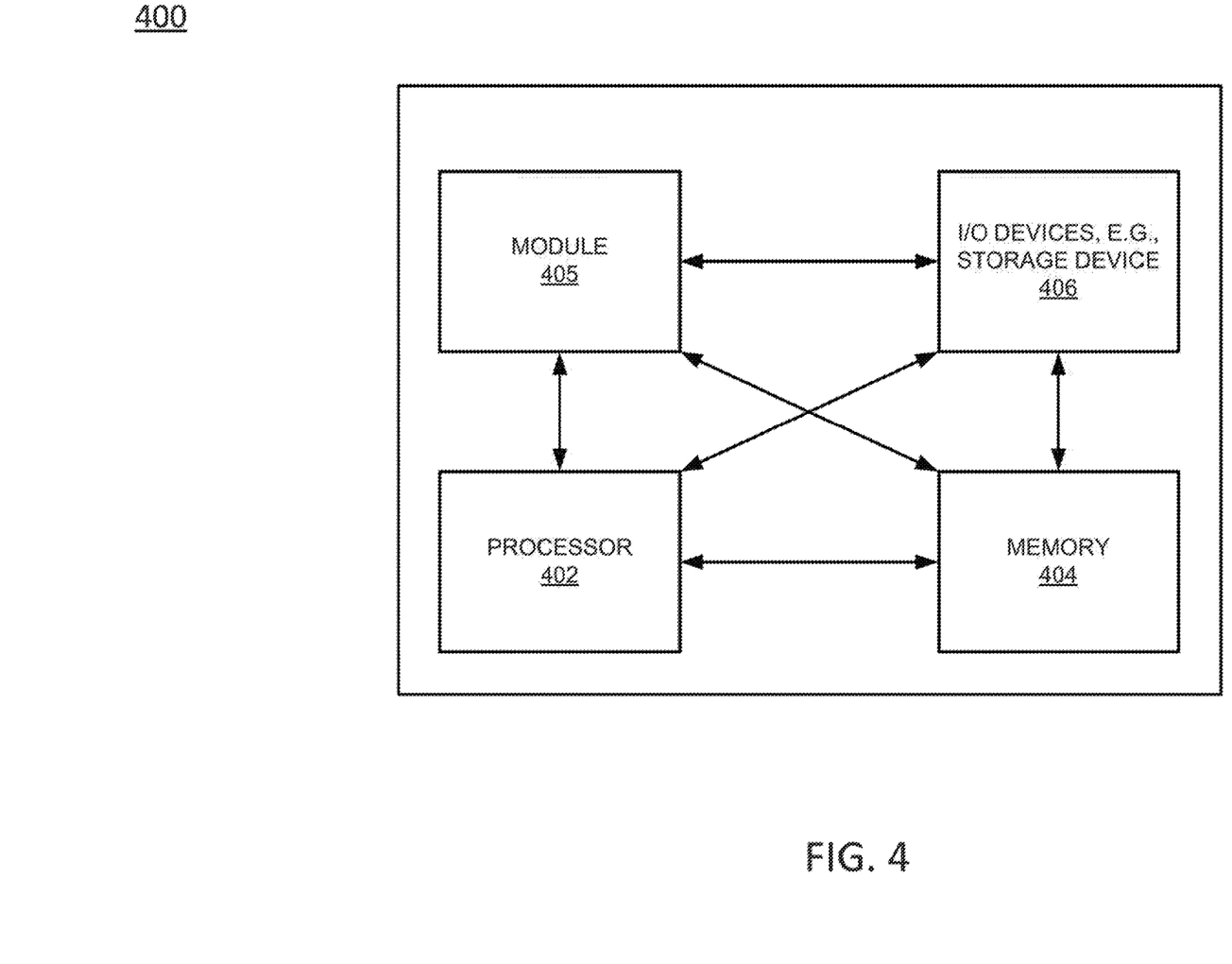
FIG. 4 depicts a high-level block diagram of a computing device specifically programmed to perform the functions described herein.

FIG. 4 depicts a high-level block diagram of a computing device specifically programmed to perform the functions described herein. For example, any one or more components or devices illustrated in FIG. 1 or described in connection with the methods 200 and 300 may be implemented as the system 400. For instance, the SDN local access element 112 of FIG. 1 (such as might be used to perform the method 200) could be implemented as illustrated in FIG. 4. In another example, the gateway device 108 of FIG. 1, the digital devices connected to the gateway device 108, and/or other customer premises equipment (such as might be used to perform the method 300) could be implemented as illustrated in FIG. 4.

As depicted in FIG. 4, the system 400 comprises a hardware processor element 402, a memory 404, a module 405 for restoring local access elements in an SDN, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for restoring local access elements in an SDN may include circuitry and/or logic for performing special purpose functions relating to initializing an SDN local access element following an outage. The input/output devices 406 may include, for example, storage devices (including but not limited to, a tape drive, a floppy drive, a hard disk drive or a compact disk drive), a receiver, a transmitter, a fiber optic communications line, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for restoring local access elements in an SDN (e.g., a software program comprising computer-executable instructions) can be loaded into memory 404 and executed by hardware processor element 402 to implement the steps, functions or operations as discussed above in connection with the example methods 200 and 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for restoring local access elements in an SDN (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
    detecting, by a software defined networking local access element connected to a customer premises, a disruption in a connection between the software defined networking local access element and a software defined networking controller in a core network;
    retrieving, by the software defined networking local access element subsequent to the detecting, configuration data and customer provisioning data from equipment located at the customer premises;
    initializing, by the software defined networking local access element, the software defined networking local access element with the configuration data and customer provisioning data to provide a service to the customer premises; and
    providing the service, by the software defined networking local access element, to the customer premises without restoring the connection between the software defined networking local access element and the software defined networking controller.

2. The method of claim 1, further comprising:
    prior to the retrieving, sending, by the software defined networking local access element, the configuration data and customer provisioning data to the equipment.

3. The method of claim 2, wherein the sending is performed periodically.

4. The method of claim 2, wherein the sending is performed randomly.

5. The method of claim 2, wherein the sending is performed automatically in response to the software defined networking local access element connecting to the equipment.

6. The method of claim 1, wherein the connection is interrupted due to a loss of power by the software defined networking local access element.

7. The method of claim 1, wherein the equipment located at the customer premises comprises a router.

8. A non-transitory computer-readable medium storing instructions which, when executed by a processor of a software defined networking local access element connected to a customer premises, cause the processor to perform operations, the operations comprising:
    detecting a disruption in a connection between the software defined networking local access element and a software defined networking controller in a core network;
    retrieving configuration data and customer provisioning data for the software defined networking local access element from equipment located at the customer premises;
    initializing the software defined networking local access element with the configuration data and customer provisioning data to provide a service to the customer premises; and
    providing the service to the customer premises without restoring the connection between the software defined networking local access element and the software defined networking controller.

9. The non-transitory computer-readable medium of claim 8, wherein the operations further comprise:
    prior to the retrieving, sending the configuration data and customer provisioning data to the equipment.

10. The non-transitory computer-readable medium of claim 9, wherein the sending is performed periodically.

11. The non-transitory computer-readable medium of claim 9, wherein the sending is performed randomly.

12. The non-transitory computer-readable medium of claim 9, wherein the sending is performed automatically in response to the software defined networking local access element connecting to the equipment.

13. The non-transitory computer-readable medium of claim 9, wherein the connection is interrupted due to a loss of power by the software defined networking local access element.

14. The non-transitory computer-readable medium of claim 8, wherein the equipment located at the customer premises comprises a router.

15. A software defined networking local access element connected to a customer premises, comprising:
    a processor; and
    a computer-readable medium storing instructions which, when executed by the processor, cause the processor to perform operations, the operations comprising:
        detecting a disruption in a connection between the software defined networking local access element and a software defined networking controller in a core network;
        retrieving configuration data and customer provisioning data for the software defined networking local access element from equipment located at the customer premises;
        initializing the software defined networking local access element with the configuration data and customer provisioning data to provide a service to the customer premises; and
        providing the service to the customer premises without restoring the connection between the software defined networking local access element and the software defined networking controller.

16. The software defined networking local access element of claim 15, wherein the operations further comprise:

prior to the retrieving, sending the configuration data and customer provisioning data to the equipment.

17. The software defined networking local access element of claim 16, wherein the sending is performed periodically.

18. The software defined networking local access element of claim 16, wherein the sending is performed randomly.

19. The software defined networking local access element of claim 16, wherein the sending is performed automatically in response to the software defined networking local access element connecting to the equipment.

20. The software defined networking local access element of claim 15, wherein the connection is interrupted due to a loss of power by the software defined networking local access element.

* * * * *